(12) United States Patent
Guo et al.

(10) Patent No.: US 12,259,846 B2
(45) Date of Patent: Mar. 25, 2025

(54) COMPUTING DEVICE AND COMPUTING SYSTEM

(71) Applicant: SHENZHEN MICROBT ELECTRONICS TECHNOLOGY CO., LTD., Guangdong (CN)

(72) Inventors: Haifeng Guo, Guangdong (CN); Mo Chen, Guangdong (CN); Chao Xu, Guangdong (CN)

(73) Assignee: SHENZHEN MICROBT ELECTRONICS TECHNOLOGY CO., LTD., Shenzhen (CN)

( * ) Notice: Subject to any disclaimer, the term of this patent is extended or adjusted under 35 U.S.C. 154(b) by 187 days.

(21) Appl. No.: 17/918,975

(22) PCT Filed: Apr. 15, 2021

(86) PCT No.: PCT/CN2021/087416
§ 371 (c)(1),
(2) Date: Oct. 14, 2022

(87) PCT Pub. No.: WO2021/208995
PCT Pub. Date: Oct. 21, 2021

(65) Prior Publication Data
US 2023/0244630 A1 Aug. 3, 2023

(30) Foreign Application Priority Data

Apr. 17, 2020 (CN) .......................... 202010305841.9

(51) Int. Cl.
*G06F 13/00* (2006.01)
*G06F 13/40* (2006.01)
(Continued)

(52) U.S. Cl.
CPC ...... *G06F 13/4291* (2013.01); *G06F 13/4045* (2013.01); *G06F 15/17306* (2013.01)

(58) Field of Classification Search
CPC ............. G06F 13/4291; G06F 13/4045; G06F 15/17306; G06F 13/4022; G06F 13/4068; G06F 15/17325
See application file for complete search history.

(56) References Cited

U.S. PATENT DOCUMENTS 8,970,276 B1 * 3/2015 McShea ................. H03K 5/135
327/263
9,741,443 B2 8/2017 Yu et al.
(Continued)

FOREIGN PATENT DOCUMENTS

CN 101237207 A 8/2008
CN 102035514 A 4/2011
(Continued)

OTHER PUBLICATIONS

Office Action issued in Taiwanese Application No. 110113538.
(Continued)

*Primary Examiner* — Henry Tsai
*Assistant Examiner* — Kim T Huynh
(74) *Attorney, Agent, or Firm* — Dickinson Wright PLLC (57) ABSTRACT

A computing device and a computing system are provided. The computing device comprises: a plurality of computing modules; and serial communication paths between/among the plurality of computing modules. Each computing module comprises: an internal circuit for performing an operation on a signal received from a corresponding serial communication path; and an extension circuit for receiving a signal from the internal circuit as an input signal. The extension circuit comprises: a delay module for delaying the input signal, the delay module comprising one or more delay units; one or more extension select modules for selectively performing a level extension on the input signal through the signal delayed by corresponding one or more delay units to generate one or more respective level-extended signals; and
(Continued)

an output module for outputting one or more of the one or more level-extended signals.

18 Claims, 8 Drawing Sheets

(51) Int. Cl.
*G06F 13/42* (2006.01)
*G06F 15/173* (2006.01)

(56) References Cited

U.S. PATENT DOCUMENTS

| | | | |
|---|---|---|---|
| 10,545,905 | B1 | 1/2020 | Carlson et al. |
| 11,050,549 | B2 | 6/2021 | Zhang et al. |
| 2003/0197245 | A1* | 10/2003 | Zhang ................ H02M 3/1584 257/532 |
| 2006/0170474 | A1* | 8/2006 | Kim ..................... H03K 5/1565 327/175 |
| 2008/0185987 | A1 | 8/2008 | Kawakami et al. |
| 2009/0072860 | A1* | 3/2009 | Lee .................. H03K 19/01721 326/83 |
| 2010/0194454 | A1* | 8/2010 | Ito ......................... H04N 25/745 327/154 |
| 2013/0305078 | A1 | 11/2013 | Lee et al. |
| 2017/0040933 | A1 | 2/2017 | Vogel |
| 2020/0043530 | A1* | 2/2020 | Shibata ............... G11C 11/4072 |

FOREIGN PATENT DOCUMENTS

| | | |
|---|---|---|
| CN | 102165529 A | 8/2011 |
| CN | 103870421 A | 6/2014 |
| CN | 106092211 A | 11/2016 |
| CN | 206019712 U | 3/2017 |
| CN | 208608970 U | 3/2019 |
| CN | 110633104 A | 12/2019 |
| CN | 111339024 A | 6/2020 |
| CN | 212084134 U | 12/2020 |
| JP | 3990359 B2 | 10/2007 |
| JP | 2008193233 A | 8/2008 |
| TW | 200838118 A | 9/2008 |
| TW | 201351089 A | 12/2013 |
| TW | 202014950 A | 4/2020 |
| WO | 8000109 A1 | 1/1980 |

OTHER PUBLICATIONS

International Search Report and Written Opinion mailed Jul. 15, 2021 in International Application No. PCT/CN2021/087416.
Zhang Wenjie, Multi-serials Extension Based on EP3912, Computer Measurement & Control, Issue 8, Aug. 25, 2007, 1063-1066.
Ahang Jianwen, et al.; Average-Current Control Strategy of Multiple Parallel Inverters; Journal of Electrical Engineering, English Abstract, vol. 30, No. 18, Sep. 30, 2015, 61-68.
Deshang Sha, et al., A Current-Fed Dual Active Bridge DC-DC Converter Using Extended Duty Cycle Control and Magnetic-Integrated Inductors With Optimized Voltage Mismatching Control; IEEE Transactions on Power Electronics; Apr. 12, 2018, 1-11.

* cited by examiner

COMPUTING DEVICE AND COMPUTING SYSTEM

CROSS REFERENCE TO RELATED APPLICATIONS

The present application is a U.S. national stage entry of International Application No. PCT/CN2021/087416, filed Apr. 15, 2021, which claims priority to Chinese Patent Application No. 202010305841.9 filed on Apr. 17, 2020, both of which are hereby incorporated by reference in their entireties.

TECHNICAL FIELD

The present disclosure relates to computing devices and computing systems, and more particularly, to computing devices and computing systems having multiple chips or cores that communicate in series.

BACKGROUND

In some multi-chip (or multi-core) systems, serial communication protocol is employed. The serial communication protocol uses asynchronous transfer mode. With the increasing number of chips connected in series, the amount of data to be transmitted is also increased, and the speed requirement for serial communication is also increased. The increasing performance requirements on the multichip serial systems are often limited.

Accordingly, there is a need for computing devices and computing systems that have improved performance.

SUMMARY

According to an aspect of the present disclosure, there is provided a computing device characterized by comprising: a plurality of computing modules; and serial communication paths between/among the plurality of computing modules; wherein, each computing module comprises: an internal circuit for performing an operation on a signal received from a corresponding serial communication path; and an extension circuit for receiving a signal from the internal circuit as an input signal, wherein the extension circuit comprises: a delay module for delaying the input signal, the delay module comprising one or more delay units; one or more extension select modules for selectively performing a level extension on the input signal through the signal delayed by corresponding one or more delay units to generate one or more respective level-extended signals; and an output module for outputting one or more of the one or more level-extended signals.

In some embodiments, the plurality of computing modules are a plurality of chips or cores, the operations by the internal circuits of the plurality of computing modules on the signals received from the respective serial communication paths comprise one or more of the following: computing the received signals; and forwarding the received signals.

In some embodiments, the plurality of computing modules are identical to each other. In some embodiments, the plurality of computing modules are capable of performing the same operation for the same received signal. In some embodiments, computations performed by the internal circuits of the plurality of computing modules on the respective received signals are based on a same algorithm. In some embodiments, computations of the internal circuits of the plurality of computing modules on the respective received signals are based on a same algorithm for virtual currency.

In some embodiments, the signal from the internal circuit comprises one of the following: a result of the computation by the internal circuit on the received signal; or the signal received and forwarded by the internal circuit.

In some embodiments, each computing module further comprises: an input interface circuit connected to the corresponding serial communication path and the internal circuit; and an output interface circuit connected to another corresponding serial communication path and the output module.

In some embodiments, each of the delay units comprises an even number of inverters coupled in series; the output module outputs one of the one or more level-extended signals based on an enabling signal.

In some embodiments, each extension select module receives the input signal, the signal delayed by the corresponding delay unit(s), and a select signal, and performs, based on the select signal, a high-level extension or a low-level extension on the input signal with use of the signal delayed by the corresponding delay unit(s) to generate the level-extended signal.

In some embodiments, each extension select module comprises: a first logic gate and a second logic gate each receiving the input signal and respective signals delayed by the respective delay unit(s), wherein the first logic gate and the second logic gate perform different logic operations to generate a first level-extended signal and a second level-extended signal which are differently level-extended relative to the input signal; and a select logic for selecting one of the first level-extended signal and the second level-extended signal to output.

In some embodiments, the first logic gate is an AND gate and the second logic gate is an OR gate.

In some embodiments, the one or more delay units comprises two or more delay units, the one or more extension select modules include two or more extension select modules, and the output modules include: two or more first logic gates, each receiving an enabling signal and the level-extended signal from a corresponding extension select module; and select logic for selecting and outputting a result of the operation of one of the two or more first logic gates.

In some embodiments, the one or more delay units comprises two or more delay units, the one or more extension select modules include two or more extension select modules, the extension circuit further comprises an input module which comprises a inverter connected between the corresponding serial communication path and the internal circuit, and the output module comprises: two or more first logic gates, each receiving an enabling signal and the level-extended signal from a corresponding extension select module; a select logic for selecting and outputting a result of the operation of one of the two or more first logic gates; and an invertor for inverting the output of the select logic.

In some embodiments, the received signal comprises one or more of instructions, addresses, and data.

In some embodiments, each of the computing modules further comprises a memory in which level extension information for level extension of the input signal is stored, wherein the level extension is carried out based on the level extension information.

In some embodiments, the computing device further comprises a control module, wherein the control module is configured to monitor states of the plurality of computing modules and provide the plurality of computing modules with information on the respective level extensions to be carried out by the plurality of computing modules, based on the results of the monitoring.

In some embodiments, the control module is configured to monitor the state as below: a) issue commands to the plurality of computing modules, wherein the commands allow the plurality of computing modules to feedback specified information to the control module, wherein the commands at least include information indicating amounts of level extensions to be carried out by the relevant computing modules, and wherein the relevant computing modules operate based on the indicated amounts of level extension to feedback the specified information; b) determine, according to the information feedback from the plurality of computing modules, whether each of the computing modules receives the commands correctly based on the amounts of the level extensions; and c) if it is determined that there is a computing module that does not receive the command correctly, at least issue a command again to the computing module that does not receive the command correctly, the command that is issued again including at least an increased amount of level extension; and d) repeat b) and c) until it is determined that all the plurality of computing modules have received the commands correctly or a predetermined number of repeating cycles is reached.

In some embodiments, the plurality of computing modules comprise a first computing module and one or more second computing modules, the first computing module is configured to monitor the states of the one or more second computing modules, and provide, based on the results of the monitoring, the one or more second computing modules with information on the respective level extensions to be carried out by the one or more second computing modules.

In some embodiments, the first computing module is configured to monitor the states as follows: a) issue commands to the one or more second computing modules, wherein the commands allow the one or more second computing modules to feedback specified information to the first computing module, and the commands include at least information indicating amount of level extension to be performed by the relevant second computing modules, and wherein the relevant second computing modules operate based on the indicated amounts of level extension to feedback the specified information; b) determine, according to the information feedback from the one or more second computing modules, whether the second computing modules each receive the commands correctly based on the amounts of the level extensions; and c) in the case it is determined that there is a second computing module that does not receive the commands correctly, at least issue a command again to the second computing module that does not receive the command correctly, the command issued again including at least an increased amount of level extension; and d) repeat b) and c) until it is determined that the one or more second computing modules have received the commands correctly or a predetermined loop condition is reached.

According to another aspect of the present disclosure, there is also provided a computing system characterized by comprising: a computing device according to any of the embodiments of the present disclosure.

Other features of the present disclosure and advantages thereof will become apparent from the following detailed description of exemplary embodiments of the present disclosure with reference to the accompanying drawings.

BRIEF DESCRIPTION OF DRAWINGS

The accompanying drawings, which are incorporated in and constitute a part of this specification, illustrate embodiments of the present disclosure and together with the description, serve to explain the principles of the disclosure.

The present disclosure may be more clearly understood from the following detailed description taken in conjunction with the accompanying drawings, in which.

Note that in the embodiments described below, the same reference numerals are used in common between different drawings to denote the same portions or portions having the same functions, and a repetitive description thereof will be omitted. In this specification, like reference numerals and letters are used to designate like items, and therefore, once an item is defined in one drawing, further discussion thereof is not required in subsequent drawings.

For convenience of understanding, the positions, dimensions, ranges, and the like of the respective structures shown in the drawings and the like do not necessarily indicate actual positions, dimensions, ranges, and the like. Therefore, the disclosed inventions shall not be limited to the positions, dimensions, ranges, etc. disclosed in the drawings and the like.

DETAILED DESCRIPTIONS OF EXEMPLARY EMBODIMENTS

Various exemplary embodiments of the present disclosure will now be described in detail with reference to the accompanying drawings. It should be noted that: the relative arrangement of parts and steps, numerical expressions and numerical values set forth in these embodiments are not intended to limit the scope of the present disclosure unless specifically stated otherwise. Additionally, techniques, methods, and apparatus known to one of ordinary skill in the relevant arts may not be discussed in detail but are intended to be part of the specification where appropriate.

It should be understood that the following description of at least one exemplary embodiment is merely illustrative and is not intended to limit the disclosure, its application, or uses. It should also be appreciated that any implementation described exemplarily herein does not necessarily indicate that it is preferred or advantageous over other implementations. The disclosure is not limited by any expressed or implied theory presented in the preceding technical field, background, summary or the detailed description.

In addition, certain terminology may also be used in the following description for the purpose of reference only, and is thus not intended to be limiting. For example, the terms "first," "second," and other such numerical terms referring to structures or elements do not imply a sequence or order unless clearly indicated by the context.

It will be further understood that the terms "comprises" and/or "comprising", when used herein, specify the presence of stated features, integers, steps, operations, elements, and/or components, but do not preclude the presence or addition of one or more other features, integers, steps, operations, elements, components, and/or groups thereof.

Figure 1:
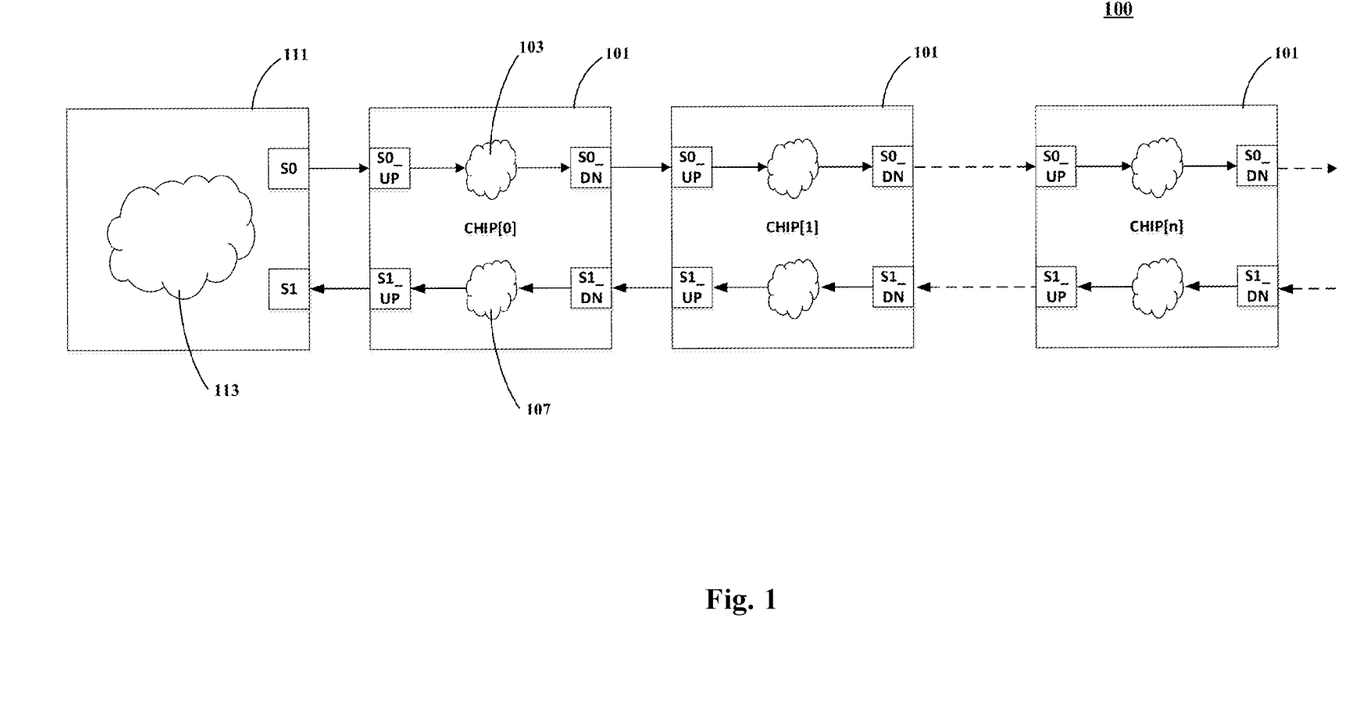
FIG. 1 shows a schematic block diagram of a computing device.

FIG. 1 shows a schematic block diagram of a computing device. As shown in FIG. 1, a computing device 100 includes a plurality of computing modules (e.g., chips) 101 that communicate with use of a serial communication protocol. CHIPs CHIP [0], CHIP [1], . . . , CHIP [n] are shown in FIG. 1, connected to each other by serial communication links (e.g., S0 and S1).

Each chip 101 may include internal circuit 103 and 107 for operations related to downstream (e.g., from a control board to a remote chip) and upstream (e.g., from a remote chip to a control board) communications, respectively. The interface S0_UP to the chip of the upper stage and the interface S0_DN to the chip of the lower stage, which are connected to the internal circuit 10, 3 are connected to corresponding serial communication paths, respectively (as indicated by arrow lines in the figure). Similarly, an interface S1_UP to the upper stage chip and an interface S1_DN to the lower stage chip, which are connected to the internal circuit 107, are connected to the corresponding serial communication paths, respectively.

FIG. 1 also shows a control board 111 on which a control circuit or logic or chip 113 is formed. The control board 111 may communicate with the computing modules 101 via, for example, a serial communication path (as indicated by the arrowed lines in the figure) to provide, for example, instructions, addresses, data, and the like thereto.

Since serial communication requires very few signals (one communication signal downstream and one communication signal upstream), it is very convenient to wire multiple chips in series (wherein signals are passed from one chip to the next) at the system board level. The serial communication protocol uses asynchronous transfer mode.

The inventors of the present application have found that serial communication has low requirements on the timeliness of signals, but has high requirements on the duty cycle which has a great influence on the success rate of communication, especially in a computing device or system integrating a plurality of chips (or cores) for intensive computation. Transferring of the communication signals among a plurality of chips in series stage by stage may cause the duty cycle of the communication signals deteriorated, and the more chips the more the duty cycle is deteriorated. In the low speed mode or when the number of chips connected in series is small, the influence of the duty ratio is small. However, as the number of chips connected in series increases, the amount of data to be transmitted also increases, and the speed requirement for serial communication also increases. The duty cycle also has an increasing effect in the high speed mode. The duty cycle of the serial communication signal has become a key factor restricting the performance improvement of a multi-chip serial computing system.

Based on the above recognitions of the inventors, the inventions disclosed herein are proposed.

Figure 2:
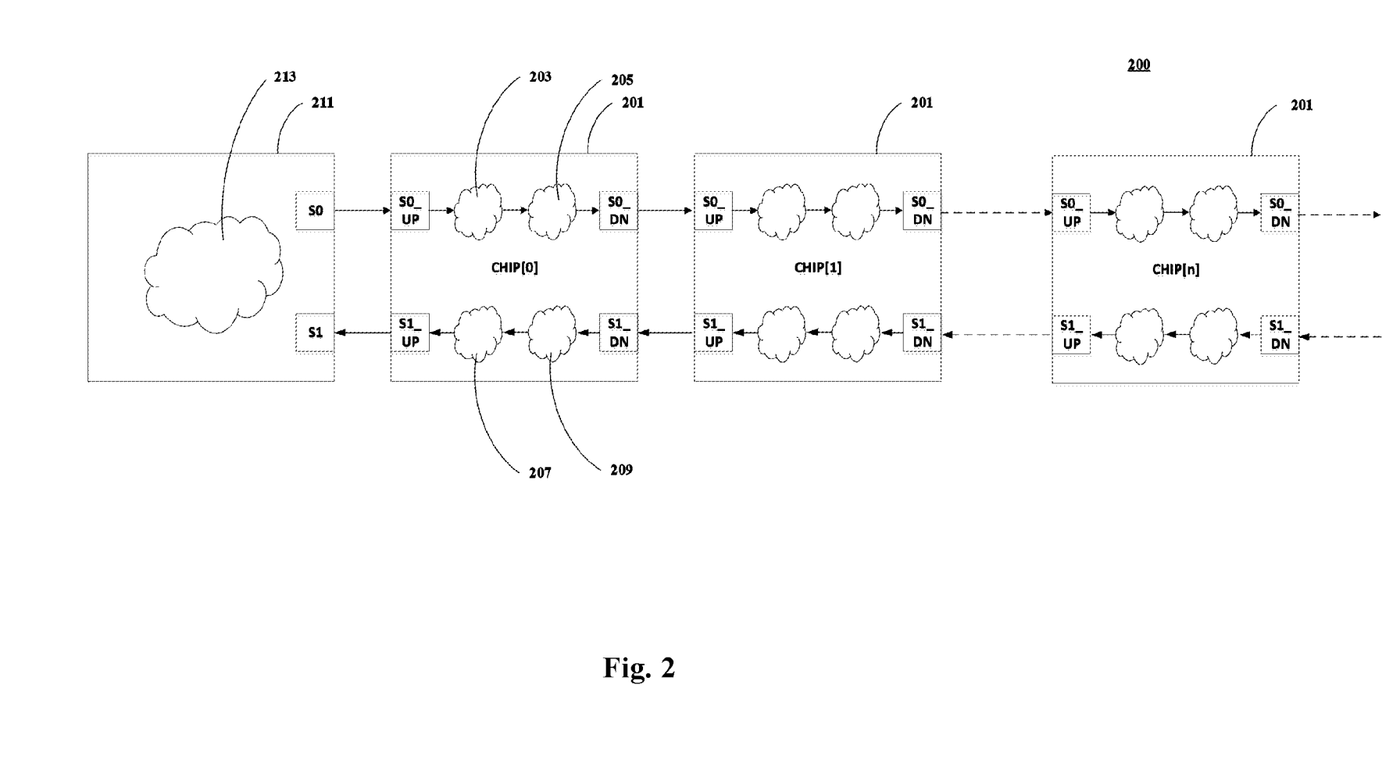
FIG. 2 shows a schematic block diagram of a computing device in accordance with an embodiment of the present disclosure.

FIG. 2 shows a schematic block diagram of a computing device according to an embodiment of the present disclosure. As shown in FIG. 2, computing device 200 may include: a plurality of computing modules 201, and serial communication paths (shown by the arrowed lines in the figure) between the plurality of computing modules 201. The computing module 201 may be, for example, a chip or a core.

Similarly, as an example of the computing module, CHIPs CHIP [0], CHIP [1], . . . , CHIP [n], which are connected to each other by a serial communication link and communicate using a serial communication protocol, are shown in FIG. 2. Here, while n chips are shown in FIG. 2 as computing modules, it should be understood that more or fewer computing modules may be employed.

Each computing module includes internal circuit for conducting operation(s) on the signal received from the corresponding serial communication path. As shown, each chip 201 may include internal circuits 203 and 207 for associated operations for downstream (e.g., as indicated by the left-to-right arrow lines in the figure) and upstream (e.g., as indicated by the right-to-left arrow lines in the figure) communications, respectively.

In some implementations, the internal circuit of the computing module performs computations on the signal received from respective corresponding serial communication paths and/or forwards received signals for transmission to a next computing module. Additionally, in some implementations, the multiple computing modules may be identical to one another. Alternatively, the plurality of calculation modules can perform the same operation on the same received signal. Alternatively, the computations of the respective received signals by the internal circuits of the plurality of calculation modules may be based on the same algorithm. Alternatively, the computations of the signals respectively received by the internal circuits of the plurality of calculation modules may be based on the same algorithm for virtual currency.

According to an embodiment of the present disclosure, each computing module may further include an extension circuit. The extension circuit receives a signal from the internal circuit as an input signal, and level-extends the input signal to change its duty cycle. As shown in the figure, the extension circuits 205 and 209 are disposed downstream of the corresponding internal circuits 203 and 207, respectively (as indicated by the arrows in the computing module) to receive signals from the internal circuits 203 and 207, respectively, for processing. The extension circuits 205 and 209 can selectively extend the width of the high level or the low level of the signal received by themselves according to actual requirements.

Similarly, FIG. 2 also shows the interfaces S0_UP and S1_UP to upper stage, which are connected to the internal circuits 203 and 207, respectively, and are connected to the corresponding serial communication paths (as indicated by the arrow-headed lines in the figure). Also shown are interfaces S0_DN and S1_DN to next stage, which are connected to the extension circuit and are connected to corresponding serial communication paths, respectively. For link S0, the interface S0_UP serves as an input interface and the interface S0_DN serves as an output interface. And for link S1, the interface S1_DN serves as an input interface and interface S1_UP serves as an output interface.

Similarly, FIG. 2 also shows a control board 211 on which a control circuit or logic or chip (hereinafter also referred to as a control module) 213 is formed. The control module 213 may communicate with the computing module 201 via, for example, serial communication paths (as indicated by the arrowed lines in the figure) to provide, for example, instructions, addresses, data, and the like thereto. It is to be understood that the present disclosure shall not be limited thereto.

Figure 3:
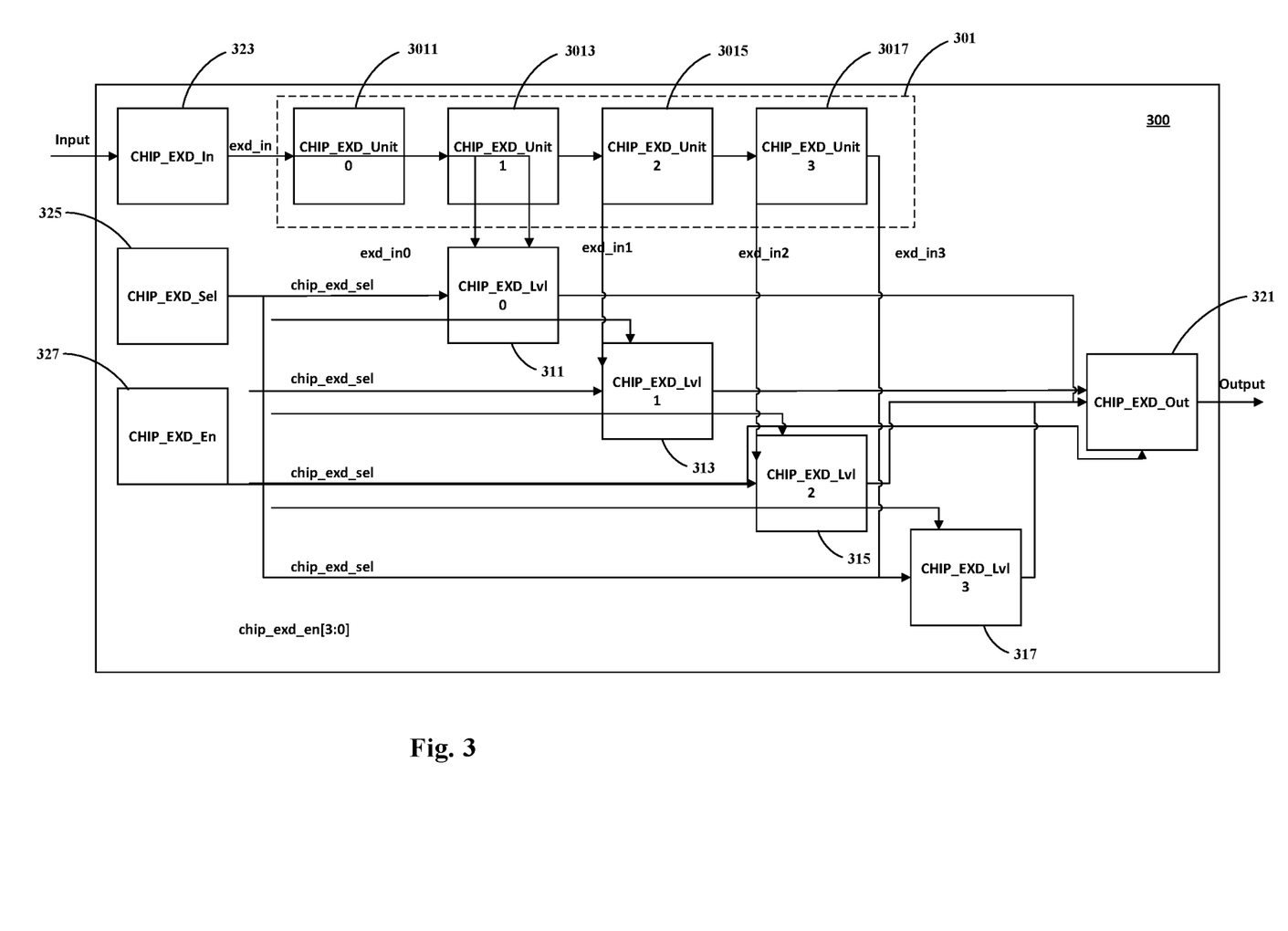
FIG. 3 shows a schematic block diagram of an extension circuit according to an embodiment of the present disclosure.

FIG. 3 shows a schematic block diagram of an extension circuit according to an embodiment of the present disclosure.

As shown in FIG. 3, the extension circuit 300 receives as input the output of the corresponding internal circuit (see FIG. 2). As previously described, the received signal from the internal circuit may include one of: the result of the calculation by the internal circuit on the signal it is received; or the signal received and forwarded by the internal circuit.

Here, FIG. 3 also shows an optional input module 323 (CHIP_EXD_In) to receive signals as input from the corresponding internal circuit. In some implementations, the input module 323 can include an inverter connected between the corresponding serial communication path and the internal circuit.

As shown in FIG. 3, the extension circuit 300 may include a delay module 301 for delaying an input signal (exd_in, which may or may not pass through the input module 323). As shown in the figure, the delay module 301 may include one or more delay units. As an example, four delay units 3011, 3013, 3015, and 3017 (CHIP_EXD_Unit 0 to CHIP_EXD_Unit 3) connected in series to each other are shown in the figure; it is to be understood that more or fewer delay units may be used and that the connection relationship of the delay elements may be varied. Each of the delay units 3011, 3013, 3015, and 3017 is used to delay an input signal. In the example shown in FIG. 3, the delay unit 3011 receives an input signal exd_in, which outputs its own delayed signal exd_in0. The delay unit 3013 outputs a signal exd_in1 delayed by the delay units 3011 and 3013. The delay unit 3015 outputs a signal exd_in2 delayed by the delay units 3011, 3013, and 3015. And the delay unit 3017 outputs a signal exd_in3 delayed by the delay units 3011, 3013, 3015, and 3017. The delay unit will be described in more detail later with reference to FIG. 4.

The extension circuit 300 may further include one or more extension select modules for selectively performing level extension on the input signal with the signal delayed by the corresponding one or more delay units to generate one or more corresponding level-extended signals. Four extension select modules 311, 313, 315, and 317 (CHIP_EXD_Lvl 0 to CHIP_EXD_Lvl 3) are shown in FIG. 3. The extension select module may be implemented using cells such as AN2/OR2/MUX2 out of standard cells, as will be further described below with reference to FIG. 5.

As shown, the extension select module 311 receives an input signal EXD_in, an output EXD_in0 of the delay unit 3011, and a select signal (chip_exd_sel from module 325 (CHIP_EXD_Sel)). The extension select module 311 selectively perform level-extension on the input signal with use of the signal exd_in0 delayed by the delay unit 3011, generating a level-extended signal. Here, as previously described, the input signal exd_in may or may not pass through the input module 323.

The extension select module 313 receives an input signal exd_in, an output exd_in1 of the delay unit 3013, and a select signal (chip_exd_sel). The extension select module 313 selectively performs level-extension on the input signal with use of the signal exd_in1 delayed by the delay unit 3013, generating a level-extended signal.

The extension select module 315 receives an input signal exd_in, an output exd_in2 of the delay unit 3015, and a select signal (chip_exd_sel). The extension select module 313 selectively performs level-extension on the input signal with the signal exd_in2 delayed by the delay unit 3015, generating a level-extended signal.

Similarly, the extension select module 317 receives an input signal, an output exd_in3 of the delay unit 3017, and a select signal (chip_exd_sel). The spread select module 317 selectively performs level-extension on the input signal with use of the signal exd_in3 delayed by the delay unit 3013, generating a level-extended signal.

In some embodiments, the low level is selected to be extended when the select signal (chip_exd_sel) is at logic 0, and the high level is selected to be extended when the select signal (chip_exd_sel) is at logic 1. The present disclosure shall not be so limited thereto, for example in alternate embodiments, inverse logics may also be used.

As such, in this example, each extension select module receives the input signal, the signal delayed by the corresponding delay unit, and a select signal, and performs high-level extension or low-level extension on the input signal with use of the signal delayed by the corresponding delay unit based on the select signal, generating a level-extended signal.

The module 325 (CHIP_EXD_Sel) may be configured to generate the select signal CHIP_EXD_Sel. The present disclosure shall not be limited thereto. For example, in some embodiments, the module 325 may receive select signal chip_exd_sel from outside of the extension module 300. In addition, in the example shown in FIG. 3, the extension select modules are shown as all receiving the select signal chip_exd_sel; it should be understood, however, that this is merely exemplary and that the configuration of the select signal may be varied. For example, in other embodiments, it may be configured such that the select signals for different extension select modules are different.

The extension circuit 300 may further comprise an output module for outputting one or more of the one or more level-extended signals. As shown in FIG. 3, the output module 321 (CHIP_EXD_Out) receives the outputs of the respective extension select modules 311 to 317, and receives an enable signal CHIP_EXD_en [3:0], so that one of the level-extended signals output from the respective extension select modules is output based on the enable signal. It should be understood that this is merely exemplary; for example, in other implementations, the enable signal chip_exd_en may also be provided to each of the extension select modules to enable selective output.

Also shown in FIG. 3 is module 327 (CHIP_EXD_En). In some embodiments, module 327 (CHIP_EXD_En) may be configured to generate an enable signal CHIP_EXD_En. The present disclosure shall not be limited thereto. For example, in some embodiments, module 327 may receive enable signal chip_exd_en from outside of extension module 300.

Figure 4:
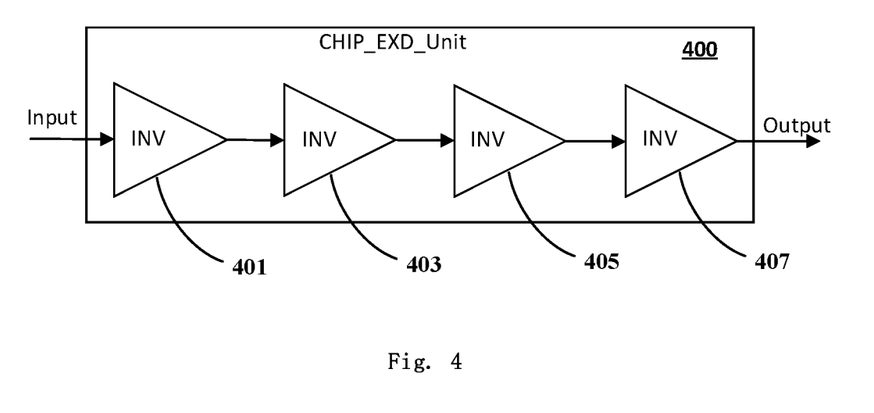
FIG. 4 shows a schematic block diagram of a delay unit according to an embodiment of the present disclosure.

FIG. 4 shows a schematic block diagram of a delay unit according to an embodiment of the present disclosure. As shown in FIG. 4, the delay unit 400 may include an even number of inverters connected in series. Delay unit 400 may represent any of the delay units shown in FIG. 3. In FIG. 4, the delay unit 400 is shown as including 4 inverters (INV) 401 to 407 connected in series with each other; however, it should be understood that more or fewer inverters may be included, such as 2, 6, 8 . . . inverters, and so forth. The delay unit may be implemented using a buffer/inverter (BUF/INV) or the like which are provided as standard units. It should also be understood that the number of inverters in each delay unit may be the same or different.

Figure 5:
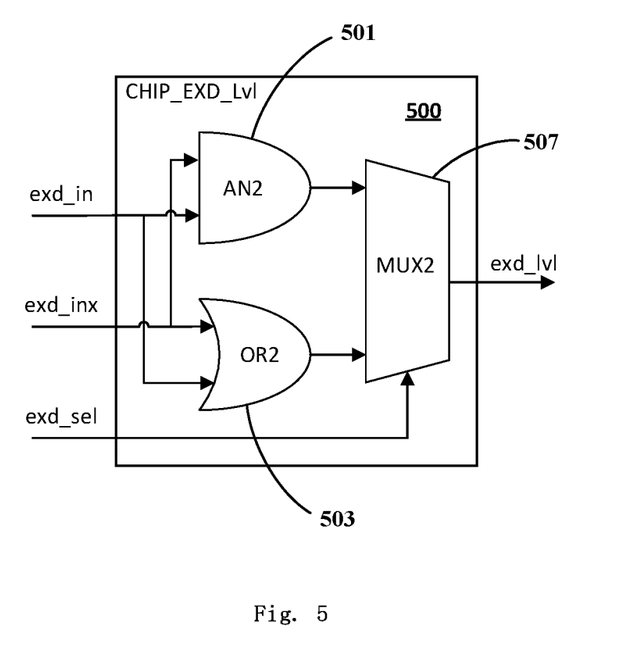
FIG. 5 shows a schematic block diagram of an extension select module in accordance with an embodiment of the present disclosure.

FIG. 5 shows a schematic block diagram of an extension select module, according to an embodiment of the present disclosure. As shown in FIG. 5, the extension select module 500 may include a first logic gate 501 and a second logic gate 503. The first logic gate 501 and the second logic gate 503 receive the input signal exd_in and the signal exd_inx (e.g., one of exd_in0 to exd_in 3) delayed by a corresponding delay unit, respectively. The first logic gate 501 and the second logic gate 503 are configured to perform different logic operations to generate a first level-extended signal and a second level-extended signal that are differently level-extended with respect to the input signal. In some implementations, the first logic gate 501 is an AND gate and the second logic gate is an OR gate; or the reverse may also be possible.

The extension select module 500 may include a select logic 507 for selecting one of the first level-extended signal and the second level-extended signal to output. As shown, the select logic is implemented as a multiplexer 507 (MUX 2) that receives a select signal exd_sel and selects, based on the select signal exd_sel (exd_lvl), one of the first and second level-extended signals to output. Here, the select signal exd_sel corresponds to the select signal chip_exd_sel shown in FIG. 3. As described in more detail below in conjunction with FIGS. 7 and 8, the width of the high or low level of the signal may be adjusted by the operation of the first and second logic gates. By selecting the delay unit, the amount of adjustment can be adjusted.

Incidentally, in this document, "logic" may be realized by hardware, software, or a combination of hardware and software. Thus, in some embodiments, "logic" may also be referred to as logic components which may be implemented in hardware or a combination of hardware and software (e.g., firmware).

Figure 6:
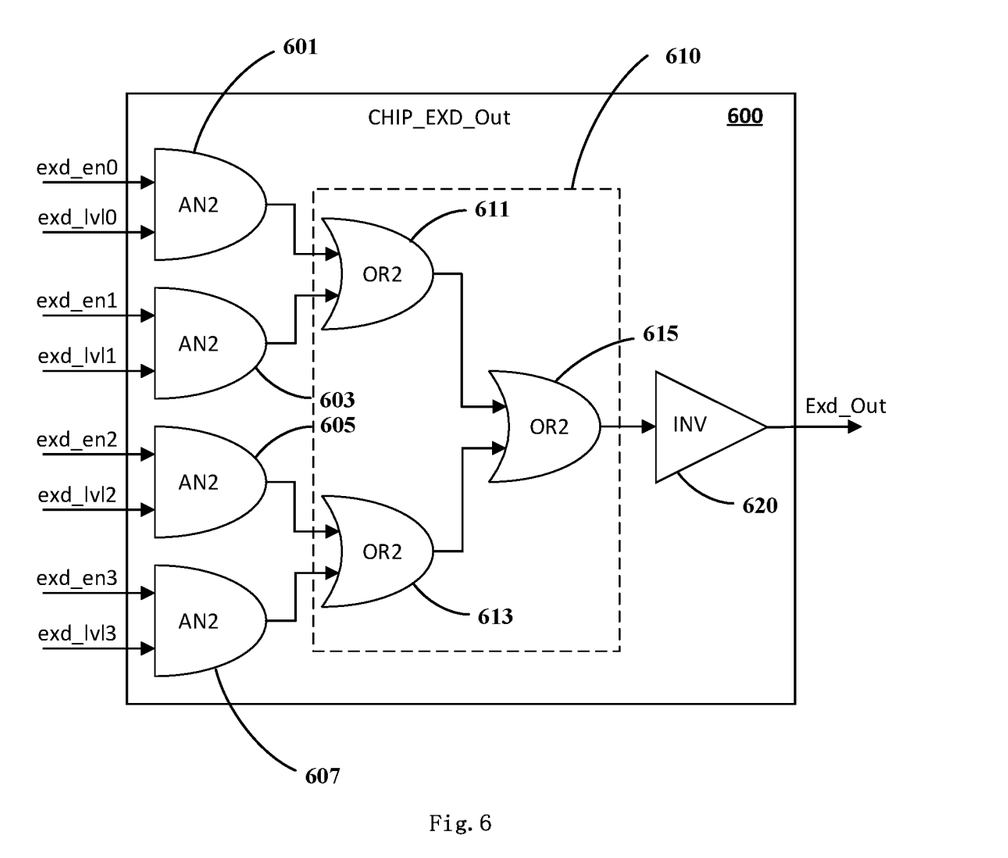
FIG. 6 shows a schematic block diagram of an output module according to an embodiment of the present disclosure.

FIG. 6 shows a schematic block diagram of an output module according to an embodiment of the present disclosure. As shown in FIG. 6, the output module 600 may include two or more first logic gates 601-607. Each first logic gate receives one of the level-extended signals exd_lvl [0-3] from a corresponding extension select module and one of the corresponding enable signals exd_en [0-3]. The enable signal exd_en may correspond to the enable signal chip_exd_en shown in FIG. 3. In some embodiments, the first logic gate is an AND gate; it is to be understood that the disclosure shall not be limited thereto. As shown in FIG. 6, the logic gate 601 receives the level extended signal exd_lvl0 from the corresponding extension select module and the corresponding enable signal exd_en0. The logic gate 603 receives the level extended signals exd_lvl1 from the corresponding extension select module and the corresponding enable signal exd_en1. The logic gate 605 receives the level extended signal exd_lvl2 from the corresponding extension select module and the corresponding enable signal exd_en2. The logic gate 607 receives the level extended signal exd_lvl3 from the corresponding extended select module and the corresponding enable signal exd_en3.

The output module 600 may further comprise a select logic 610 for selecting one of the operation results of the first logic gates 601-607 to be output. In some embodiments, select logic 610 may be implemented as a multiplexer. In a more specific implementation as shown in FIG. 6, the select logic 610 is implemented to include three OR gates. The OR gate 611 receives as inputs the outputs of the first logic gates 601 and 603 to perform an OR operation. The OR gate 613 receives as inputs the outputs of the first logic gates 605 and 607 to perform an OR operation. Or gate 615 receives as inputs the outputs of OR gates 611 and 613 to perform an OR operation.

In the embodiment shown in FIG. 6, exd_en0 through exd_en3 can be used to control the width of the level that need to be spread. For example, in some implementations (e.g., as shown in FIG. 3), if exd_en0 is active, it indicates that the level needs to be extended by the width of the delay of one stage of CHIP_EXD_Unit. If exd_en1 is active, it indicates that the level needs to be extended by the width of the delay of two stages of CHIP_EXD_Units. If exd_en2 is active, it indicates that the level needs to be extended by the width of the delay of three stages of CHIP_EXD_Units. If exd_en3 is active, it indicates that the level needs to be extended by the width of the delay of four stages of CHIP_EXD_Units. As such, more CHIP_EXD_units and extension select modules CHIP_EXD_Lvls can be added as needed to achieve the goal of expanding width(s) of level(s).

In some embodiments, the output module 600 may further include an optional inverter 620 for inverting the output of the select logic.

Figure 7:
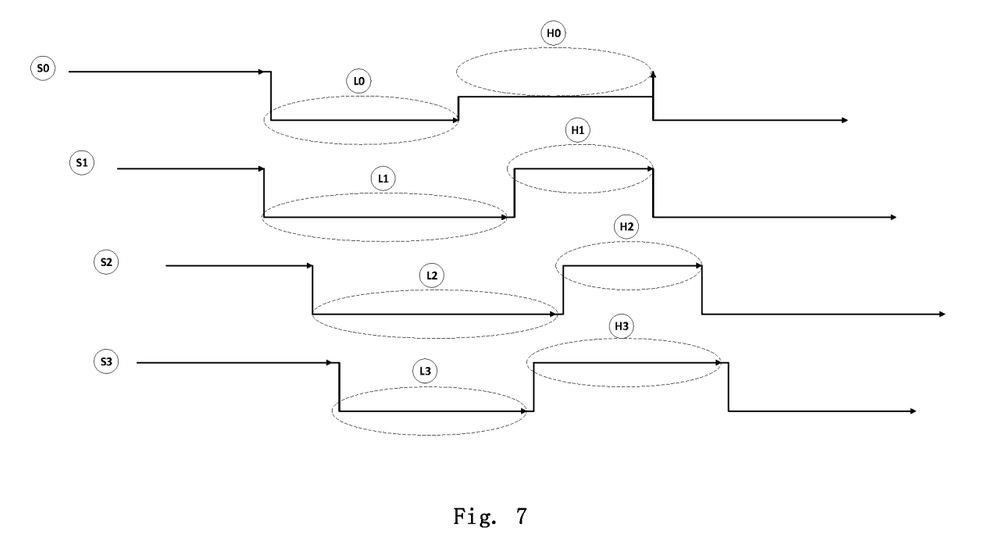
FIGS. 7 and 8 show timing diagrams for explaining level extension, respectively, according to an embodiment of the present disclosure.
Figure 8:
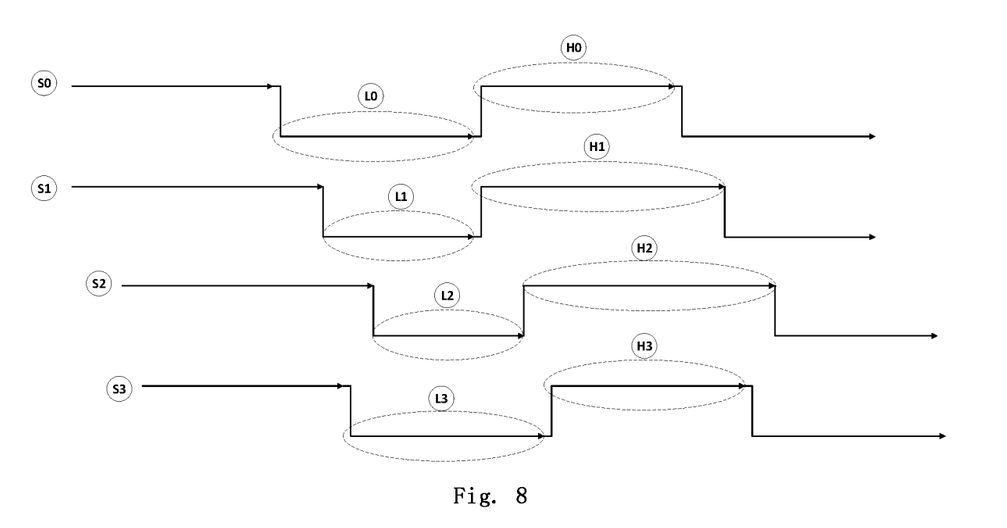

FIGS. 7 and 8 respectively show exemplary timing diagrams for explaining level extension according to an embodiment of the present disclosure.

FIG. 7 shows an example of the effect of expanding the high level. In FIG. 7, the signal waveform S0 schematically shows an original state of the communication signal at the originating end. As shown in the figure, the signal waveform S0 is the original state of the communication signal at the originating end, in which the width of the low level L0 and the width of the high level H0 are substantially the same. The duty cycle at this time is substantially around 50% of the ideal state. If the communication signal received at the receiving end also maintains such an original state, the success rate of communication would be high.

The signal waveform S1 schematically shows a state where the communication signal is transferred into the n-th stage chip and is not processed by the extension module. As shown in the figure, the signal waveform S1 is a state that the communication signal is transmitted to the n-th chip without being processed by the extension module, and the width of the low level L1 is significantly larger than that of the high level H1, wherein the low level L1 is relatively large in ratio (for example, about 62.5%), and the high level H1 is relatively small (for example, about 37.5%). In this case, the success rate of the communication at the receiving end is low.

The signal waveform S2 schematically shows a state where the communication signal passes through several stages of delay units (EXD_Unit) in the extension module within the n-th stage chip. As shown in the figure, the signal waveform S2 is a state where the communication signal is transmitted into the n-th stage and passes through several stages of units EXD_Units in the extension module, where the width of low level L2 is significantly greater than that of high level H2, low level L2 accounts for 62.5%, and high level H2 accounts for 37.5%. The high and low levels have the same widths as the signal waveform S1, but have a significant delays compared to the signal waveform S1 after being delayed by several stages of EXD_Units.

The signal waveform S3 is a state after the communication signal is processed in the extension module in the n-th stage chip. As shown in the figure, the signal waveform S3 is a state of the communication signal after being processed in the extension module of the n-th stage chip, and the low level L3 width and the high level H3 width are already very close to each other through the processing of the extension module. With proper configuration, the duty cycle of the signal waveform S3 can be made to be at or near the original state of the communication signal at the originating end. Thereby, the communication success rate at the receiving end (for example, a next-stage chip) can be greatly improved.

FIG. 8 shows an example of the effect of extending the low level. As shown in FIG. 8, the signal waveform S0 is the original state of the communication signal at the originating end, in which the width of the low level L0 and the width of the high level H0 are substantially the same, and the duty cycle at this time is substantially around 50% of the ideal state. If the communication signal received at the receiving end also maintains such an original state, the success rate of communication would be high.

The signal waveform S1 is a state where the communication signal is transmitted to the n-th stage of chip without being processed by the extension module, wherein the width of the low level L1 is significantly smaller than that of the high level H1, the low level L1 is smaller (e.g., 37.5%), and the high level H1 is larger (e.g., 62.5%). In this case, the success rate of the receiving end communication is very low.

The signal waveform S2 is a state where the communication signal is transmitted to the n-th stage of on-chip and passes through several stages of EXD_Unit cells in the extension module, where the widths of the high and low levels H2 and L2 are still the same as those of the signal waveform S1, but there is a significant delay after being delayed by several stages of EXD_Units compared with the signal waveform S1.

The signal waveform S3 is a state of the communication signal after being processed in the extension module in the n-th stage chip, and the width of the low level L3 and the width of the high level H3 are already very close after the extension module processes the low level width. With proper configuration, the duty cycle of the signal waveform S3 can be made to be at or near the original state of the communication signal at the originating end. In this way, the success rate of communication at the receiving end (e.g., the next-level chip) is greatly improved.

In some embodiments, each computing module further comprises a memory. Level-extension information for level-extending the input signal may be stored in the memory. For example, the level extension information may include, for example, information indicating whether high level extension or low level extension is to be performed for the computing module, and information indicating the amount of level extension. The information indicating the amount of level extension may include, for example but not limited to, time or a number of units of inverter delay time, etc. The computing module may perform the level extension based on the level extension information. In this embodiment, the level extension information may be predetermined.

In an alternative embodiment, the level extension information may be adaptively adjusted. In some implementations, the status of one or more computing modules may be monitored by another control module, or one of the computing modules, and based on the results of the monitoring, information is provided to the one or more computing modules regarding the level extension to be performed by each of the one or more computing modules.

Figure 9:
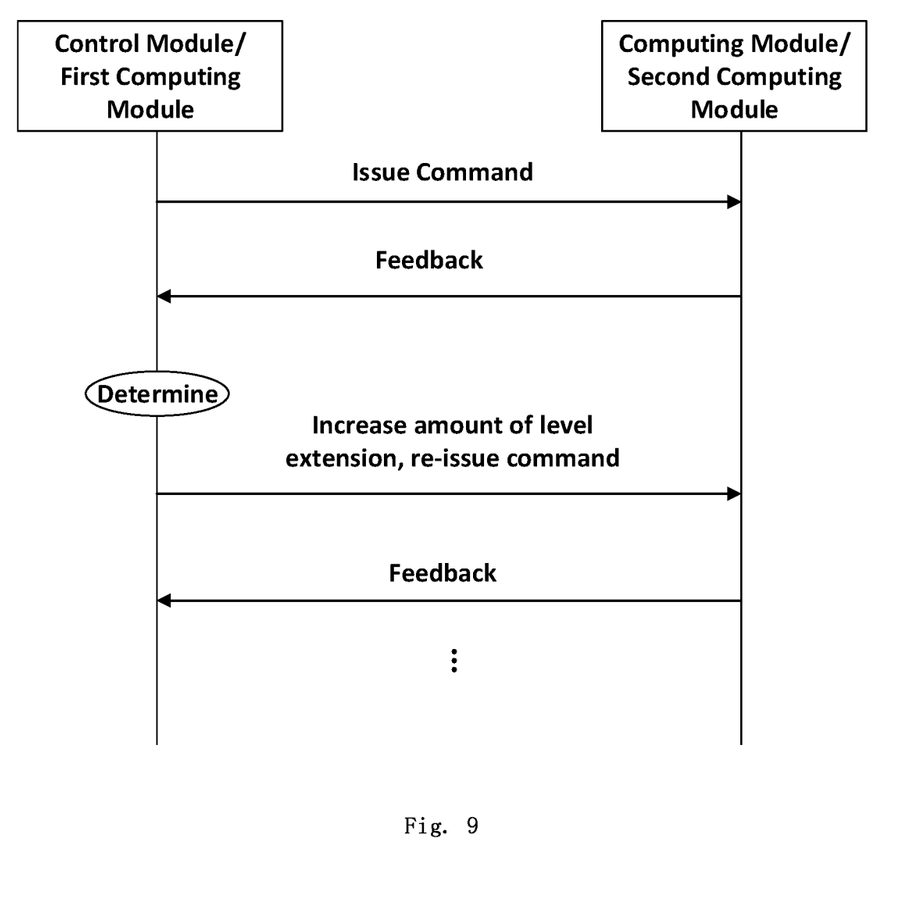
FIG. 9 illustrates an example configuration of a control module/first computing module and a computing module/second computing module according to an embodiment of this disclosure.

FIG. 9 illustrates an example configuration of a control module/first computing module and a computing module/second computing module according to an embodiment of this disclosure.

According to this embodiment, as shown in FIG. 9, a computing device may include a control module and one or more computing modules. The control module is configured to monitor states of the plurality of computing modules and provide information on level extension to be performed by each of the plurality of computing modules to the plurality of computing modules based on the result of the monitoring.

The control module is configured to monitor the states as follows:
a) issue commands to the plurality of computing modules, wherein the commands allow the plurality of computing modules to feedback specified information to the control module, wherein the commands at least include information indicating amounts of level extensions to be carried out by the relevant computing modules, and wherein the relevant computing modules operate based on the indicated amounts of level extension to feedback the specified information;
b) determine, according to the information feedback from the plurality of computing modules, whether each of the computing modules receives the commands correctly based on the amounts of the level extensions; and
c) if it is determined that there is a computing module that does not receive the command correctly, at least issue a command again to the computing module that does not receive the command correctly, the command that is issued again including at least an increased amount of level extension; and
d) repeat b) and c) until it is determined that all the plurality of computing modules have received the commands correctly or a predetermined number of repeating cycles is reached.

In alternative embodiments, the computing device may include a selected first computing module (which acts as a control module) and one or more other computing modules (second computing modules). The first computing module is configured to monitor states of the one or more second computing modules and provide information to the one or more second computing modules regarding level extension to be performed by each of the one or more second computing modules based on the result of the monitoring.

The first computing module may be configured to monitor the states as follows:
a) issue commands to the one or more second computing modules, wherein the commands allow the one or more second computing modules to feedback specified information to the first computing module, and the commands include at least information indicating amount of level extension to be performed by the relevant second computing modules, and wherein the relevant second computing modules operate based on the indicated amounts of level extension to feedback the specified information;
b) determine, according to the information feedback from the one or more second computing modules, whether the second computing modules each receive the commands correctly based on the amounts of the level extensions; and
c) in the case it is determined that there is a second computing module that does not receive the commands correctly, at least issue a command again to the second computing module that does not receive the command correctly, the command issued again including at least an increased amount of level extension; and
d) repeat b) and c) until it is determined that the one or more second computing modules have received the commands correctly or a predetermined loop condition is reached.

Figure 10:
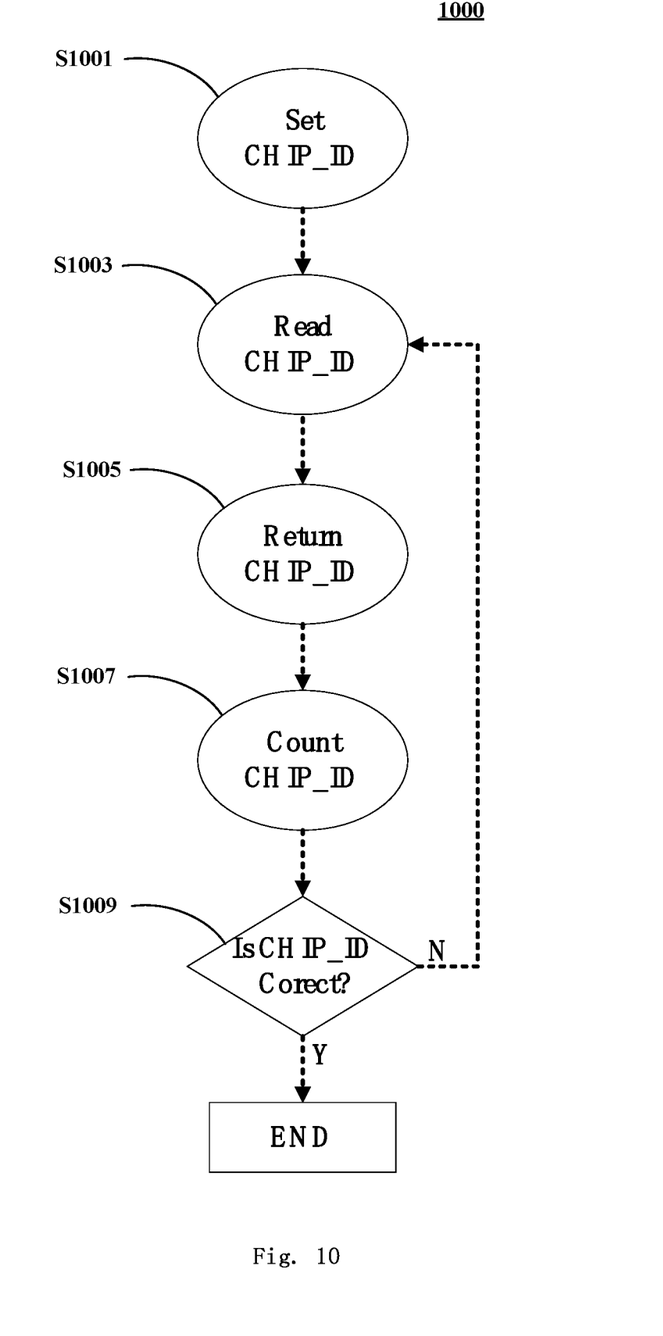
FIG. 10 illustrates a monitoring operation according to an embodiment of the present disclosure.

FIG. 10 illustrates a monitoring operation according to an embodiment of the present disclosure. According to this embodiment, the optimum extended configuration of each chip can be automatically retrieved by, for example (but not limited to), a system software in the control board with the detection operation 1000 shown in FIG. 10. As shown in FIG. 10, in step S1001, an identifier may be set in each chip: CHIP_ID or other similar identification. In step S1003, the system software issues a read CHIP_ID command to each serial chip with the current extension configuration. If the chips in series can normally receive the read CHIP_ID command, the CHIP_ID value is returned in step S1005, otherwise, the CHIP_ID value is not returned. In step S1007, the system software counts the values or number of the received CHIP_IDs for the serial chips to determine whether each serial chip can communicate normally.

If there is a chip failing to return CHIP_ID or a CHIP_ID value is returned incorrectly, the system software will automatically adjust the configuration of the extension modules in the chips according to the statistical data, for example, change the way of level extension, or increase/decrease the number of CHIP_EXD_units used, and then return to step S1003 for re-retrieve. The above loop can be repeated until each serial chip returns the correct CHIP_ID or a predetermined loop condition is reached.

By now it should also be appreciated that the present disclosure also contemplates a computing system that includes the computing device described in any of the embodiments.

Those skilled in the art will appreciate that the boundaries between the operations (or steps) described in the above embodiments are merely illustrative. Multiple operations may be combined into a single operation, single operation may be distributed in additional operations, and operations may be performed at least partially overlapping in time. Moreover, alternative embodiments may include multiple instances of a particular operation, and the order of operations may be altered in various other embodiments. However, other modifications, variations, and alternatives are also possible. The specification and drawings are, accordingly, to be regarded in an illustrative rather than a restrictive sense.

Although some specific embodiments of the present disclosure have been described in detail by way of example, it should be understood by those skilled in the art that the above examples are for illustration only and are not intended to limit the scope of the present disclosure. The various embodiments disclosed herein may be combined arbitrarily without departing from the spirit and scope of the present disclosure. Those skilled in the art will also appreciate that various modifications may be made to the embodiments without departing from the scope and spirit of the present disclosure. The scope of the present disclosure is defined by the appended claims.

What is claimed is:

1. A computing device comprising:
a plurality of computing circuits; and
serial communication paths coupling the plurality of computing circuits in series;
wherein, each computing circuit comprises:
an internal circuit for performing an operation on a signal received from a corresponding serial communication path; and
an extension circuit for receiving a signal from the internal circuit as an input signal, wherein the extension circuit comprises:
a delay circuit for delaying the input signal, the delay circuit comprising one or more delay units;
one or more extension select circuits for selectively performing a level extension on the input signal through the signal delayed by corresponding one or more delay units to generate one or more respective level-extended signals, duty cycles of which are changed with respect to the input signal; and
an output circuit for outputting one or more of the one or more level-extended signals.

2. The computing device according to claim 1, wherein, the plurality of computing circuits are a plurality of chips or cores,
the operations by the internal circuits of the plurality of computing circuits on the signals received from the respective serial communication paths comprise one or more of the following:
computing the received signals; and
forwarding the received signals.

3. The computing device according to claim 2, characterized by at least one of the following:
the plurality of computing circuits are identical to each other;
the plurality of computing circuits are capable of performing the same operation for the same received signal;
computations performed by the internal circuits of the plurality of computing circuits on the respective received signals are based on a same algorithm; and/or
computations of the internal circuits of the plurality of computing circuits on the respective received signals are based on a same algorithm for virtual currency.

4. The computing device according to claim 1, wherein the signal from the internal circuit comprises one of the following:
a result of the computation by the internal circuit on the received signal; or
the signal received and forwarded by the internal circuit.

5. The computing device according to claim 1, wherein each computing circuit further comprises:
an input interface circuit connected to the corresponding serial communication path and the internal circuit; and
an output interface circuit connected to another corresponding serial communication path and the output circuit.

6. The computing device according to claim 1, wherein each of the delay units comprises an even number of inverters coupled in series;
the output circuit outputs one of the one or more level-extended signals based on an enabling signal.

7. The computing device according to claim 1, wherein, each of the one or more extension select circuit receives the input signal, the signal delayed by the corresponding delay unit(s), and a select signal, and performs, based on the select signal, a high-level extension or a low-level extension on the input signal with use of the signal delayed by the corresponding delay unit(s) to generate the level-extended signal.

8. The computing device according to claim 1 wherein, each extension select circuit comprises:
a first logic gate and a second logic gate each receiving the input signal and respective signals delayed by the respective delay unit(s), wherein the first logic gate and the second logic gate perform different logic operations to generate a first level-extended signal and a second level-extended signal which are differently level-extended relative to the input signal; and a select logic for selecting one of the first level-extended signal and the second level-extended signal to output.

9. The computing device according to claim 8, wherein, the first logic gate is AND gate and the second logic gate is OR gate.

10. The computing device according to claim 1, wherein, the one or more delay units comprises two or more delay units, the one or more extension select circuits include two or more extension select circuits, and the output circuits include:

two or more first logic gates, each receiving an enabling signal and the level-extended signal from a corresponding extension select circuit; and select logic for selecting and outputting a result of the operation of one of the two or more first logic gates.

11. The computing device according to claim 1, wherein the one or more delay units comprises two or more delay units, the one or more extension select circuits include two or more extension select circuits, the extension circuit further comprises an input circuit which comprises a inverter connected between the corresponding serial communication path and the internal circuit, and the output circuit comprises:

two or more first logic gates, each receiving an enabling signal and the level-extended signal from a corresponding extension select circuit;

a select logic for selecting and outputting a result of the operation of one of the two or more first logic gates; and an invertor for inverting the output of the select logic.

12. The computing device according to claim 1, wherein, the received signal comprises one or more of instructions, addresses, and data.

13. The computing device according to claim 1, wherein, each of the computing circuits further comprises a memory in which level extension information for level extension of the input signal is stored, wherein the level extension is carried out based on the level extension information.

14. The computing device according to claim 1, characterized by further comprising a control circuit, wherein the control circuit is configured to monitor states of the plurality of computing circuits and provide the plurality of computing circuits with information on the respective level extensions to be carried out by the plurality of computing circuits, based on the results of the monitoring.

15. The computing device according to claim 14, wherein, monitoring the states by the control circuit comprises:

a) issuing commands to the plurality of computing circuits, wherein the commands allow the plurality of computing circuits to feedback specified information to the control circuit, wherein the commands at least include information indicating amounts of level extensions to be carried out by the relevant computing circuits, and wherein the relevant computing circuits operate based on the indicated amounts of level extension to feedback the specified information;

b) determining, according to the information feedback from the plurality of computing circuits, whether each of the computing circuits receives the commands correctly based on the amounts of the level extensions; and c) if it is determined that there is a computing circuit that does not receive the command correctly, at least issuing a command again to the computing circuit that does not receive the command correctly, the command that is issued again including at least an increased amount of level extension; and d) repeating b) and c) until it is determined that all the plurality of computing circuits have received the commands correctly or a predetermined number of repeating cycles is reached.

16. The computing device according to claim 1, wherein the plurality of computing circuits comprise a first computing circuit and one or more second computing circuits, the first computing circuit is configured to monitor the states of the one or more second computing circuits, and provide, based on the results of the monitoring, the one or more second computing circuits with information on the respective level extensions to be carried out by the one or more second computing circuits.

17. The computing device according to claim 16, wherein, monitoring the states by the first computing circuit comprises:

a) issuing commands to the one or more second computing circuits, wherein the commands allow the one or more second computing circuits to feedback specified information to the first computing circuit, and the commands include at least information indicating amount of level extension to be performed by the relevant second computing circuits, and wherein the relevant second computing circuits operate based on the indicated amounts of level extension to feedback the specified information;

b) determining, according to the information feedback from the one or more second computing circuits, whether the second computing circuits each receive the commands correctly based on the amounts of the level extensions; and c) in the case it is determined that there is a second computing circuit that does not receive the commands correctly, at least issuing a command again to the second computing circuit that does not receive the command correctly, the command issued again including at least an increased amount of level extension; and d) repeating b) and c) until it is determined that the one or more second computing circuits have received the commands correctly or a predetermined loop condition is reached.

18. A computing system comprising:

a computing device according to claim 1.

* * * * *